United States

McCartney et al.

4,021,098

May 3, 1977

[54] FIBER BUNDLE CONSOLIDATION

[75] Inventors: Ronald L. McCartney, Orange;
Vaughn C. Hogan, Sun Valley;
Eleanor A. Landgreen, Temple City;
Michael I. Bauerkemper, Cerritos,
all of Calif.

[73] Assignee: International Telephone and Telegraph Corporation, New York, N.Y.

[22] Filed: Sept. 4, 1975

[21] Appl. No.: 610,223

[52] U.S. Cl. .......................................... 350/96 C
[51] Int. Cl.² ......................................... G02B 5/16
[58] Field of Search ....... 350/96 C; 339/205, 220 R

[56] References Cited

UNITED STATES PATENTS

| | | | |
|---|---|---|---|
| 3,655,275 | 4/1972 | Seagreaves | 350/96 C |
| 3,846,010 | 11/1974 | Love et al. | 350/96 C X |

*Primary Examiner*—John K. Corbin
*Assistant Examiner*—Rolf Hille
*Attorney, Agent, or Firm*—Thomas L. Peterson

[57] ABSTRACT

A fiber optic cable for use in a fiber optic connector in which a ferrule is compressed around the end of the fiber bundle in the cable. The bore in the ferrule has a cylindrical wall with circumferentially spaced flat surfaces thereon which minimize the compression hoop effects on the peripheral fibers of the bundle, thereby maximizing fiber bundle consolidation.

11 Claims, 7 Drawing Figures

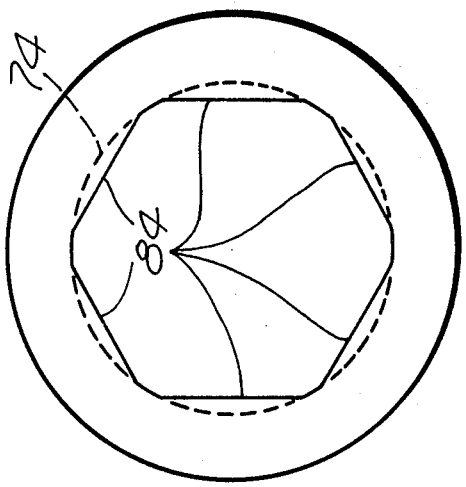
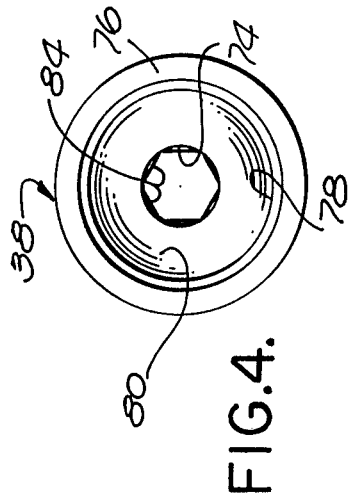
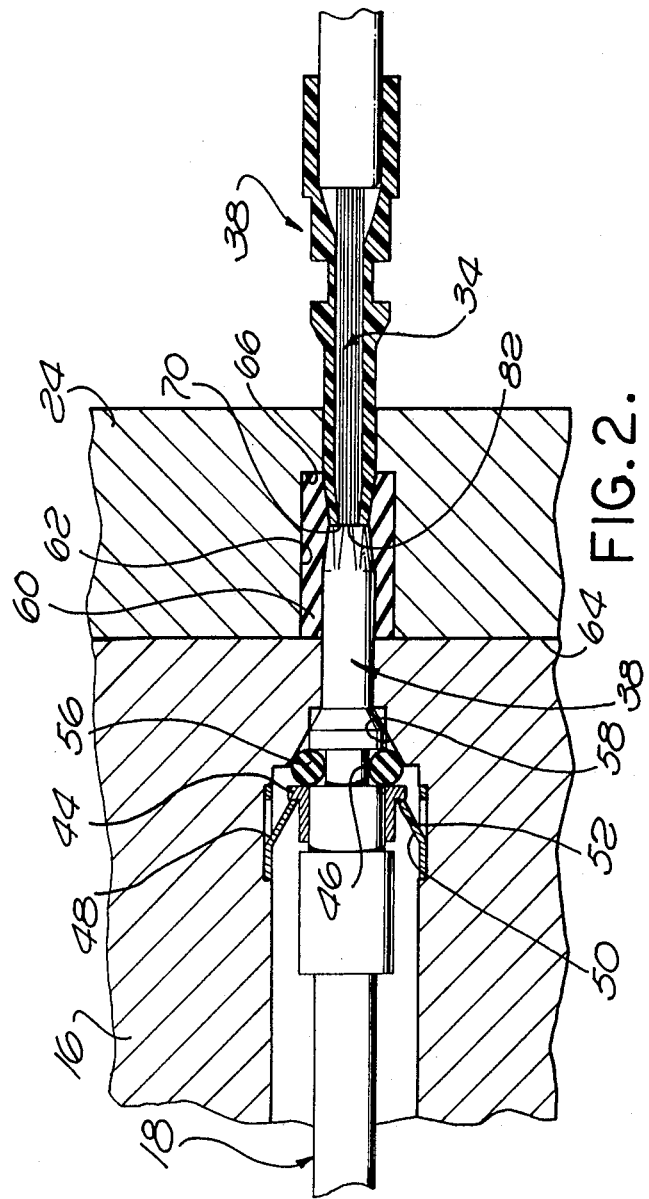
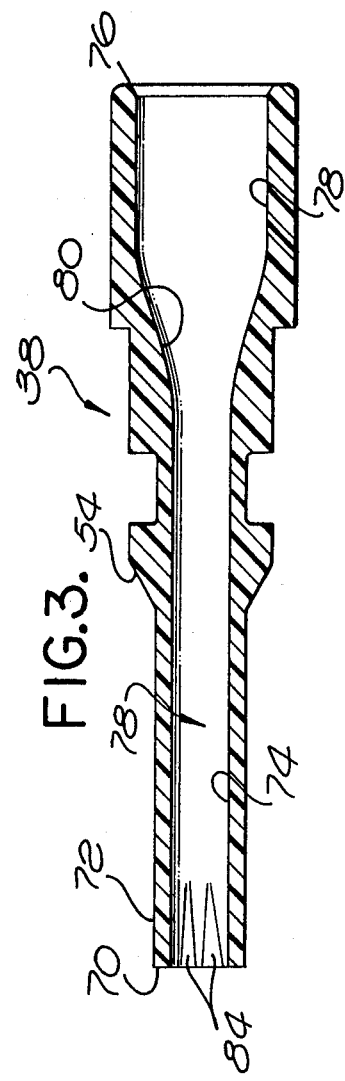

FIBER BUNDLE CONSOLIDATION

CROSS REFERENCE TO RELATED APPLICATIONS

This application is related to the following copending U.S. applications of Ronald L. McCartney, assigned to the same assignee as the present application:

1. Application entitled, "Fiber Optic Connector with Split Tine Optic Contact Arrangement", Ser. No. 510,,310, filed Sept. 30, 1974, now abandoned;
2. Application entitled, "Fiber Optic Connector and Assembly Method", Ser. No. 514,820, filed Oct. 15, 1974, now U.S. Pat. No. 3,914,015.

BACKGROUND OF THE INVENTION

The present invention relates generally to fiber optic connectors and, more specifically, to the consolidation of fiber bundles utilized in such connectors.

The employment of fiber optic cables or light guides, also sometimes referred to as optical communications fibers, for the transmission of information bearing light signals is now an established art. Much development work has been devoted to the provision of practical low-loss glass materials and production techniques for producing glass fiber cables with protective outer claddings or jackets. The claddings make the cables resemble ordinary metallic-core electrical cables upon superficial external inspection. Obviously, if fiber optic cables are to be used in practical signal transmission and processing systems, practical connectors for the connection and disconnection of fiber optic cables must be provided.

Mateable connectors using either single or multiple fiber cables are subject to losses caused by traverse displacements, excessive axial gap distances, axial misalignment, broken fibers, reflective losses, chipped or scratched mating surfaces, and for multiple fiber bundles, low density fiber packing. Multiple fiber cable optical losses are minimized by consolidating the fiber optic bundle to produce a closed pack array, leaving only the spaces between the adjacent fibers and the fiber cladding as lost optical area. Traverse displacements caused by slop in the alignment socket in the connector, concentricity deviations of the contacts terminating the optical bundles, and individual fiber bundle diameter variations all result in light transmission losses. Coupled to concentricity deviations, rotational misalignments — even when the contacts are keyed — cause enough misalignment between fiber bundles to effectively randomize the mated fiber alignment and thus cause light transmission losses. The present invention is primarily concerned with the problem of consolidating the fibers in a fiber optic bundle to produce a closed pack array.

A common technique of obtaining a high density fiber bundle is the pushing of the bundle into a tight fitting contact or sleeve. Difficulties can be encountered in pushing the fibers into a restricting contact since some of the fibers will catch on the end of the contact and break. If the contact inside area is large enough so that the fibers in the bundle to not break, then the individual fibers remain somewhat loose so that high density packing is not achieved. Another technique for achieving fiber bundle consolidation is disclosed in the aforemention copending application Ser. No. 510,310. Such application describes a split tine contact which opens when the fiber bundle is inserted therein. Occasionally fibers in the bundle will protrude from the slits in the split tine thereby resulting in light transmission losses. Further, the use of a split tine contact creates an oval bundle configuration which must be keyed to obtain bundle-to-bundle rotational alignment. Keying of the contacts terminating aligned fiber bundles results in increased cost. Furthermore, as previously stated, even when contacts are keyed, rotational misalignments are sufficient to result in appreciable light transmission losses.

U.S. Pat. No. 3,846,010 to Love et al. discloses the use of an hexagonal ferrule for consolidating fibers in an optical fiber bundle. The patent states that the fibers in the bundle are retained in a closed pack array wherein the centers of the ends of any three contiguous fibers in the bundle are disposed at the vertices of an equilateral triangle. While theoretically maximum fiber consolidation can be achieved by this technique, in practice this is not the case. The reason is that natural tolerances such as fiber diameter variations, ferrule inside configuration variations, and ferrule profile eccentrically variations create closed pack imperfections which result in light transmission losses. Further, mating hexagonal ferrules require keying in order to minimize rotational misalignments. Even when the ferrules are keyed, losses can still result because of the problem of maintaining dimenstional tolerances, particularly in the mass production of commercial connectors. Such problems with the hexagonal ferrule for terminating fiber optic bundles is not serious when the number of fibers is small and the fiber diameters are relatively large, on the order of 5 mils. However, in practice the hexagonal termination ferrule has not been entirely satisfactory for fiber optic bundles employing hundreds of fibers of diameters less than 2 mils. The minimum light transmission losses which have been reported as being achieved with the use of small fiber bundles has been on the order of 3 dB. Further, it will be appreciated that the cost of manufacturing the hexagonal ferrule would be significant and difficulties would be encountered in attempting to insert a fiber bundle into the ferrule without breaking peripheral fibers in the bundle.

Reference is also made to the aforementioned copending application Ser. No. 514,820 which discloses an hexagonal ferrule for terminating the end of a fiber optic bundle. The ferrule is formed of a heat-shrinkable metal which is shrunk down around the bundle end to consolidate the fibers. While greater consolidation may be obtained by this technique than that obtained by the technique disclosed in the Love et al patent, the construction of the heat-shrinkable metal ferrule still is not sufficient to compact the fibers in to the theoretical hexagonal pattern, nor enough to reduce optical transmission losses to levels required for some commercial applications.

We have attempted to obtain a high density of the fibers of a fiber optic bundle by using a plastic contact and permanently constricting the contact after the bundle has been inserted therein. A difficulty which is frequently encountered, however, during constriction of the contact is that the peripheral bundle fibers align in a compression hoop. The hoop is further supported by radially aligned fibers forming spokes. Since the fibers (normally quartz) are highly compression resistant, restriction beyond the fiber hoop is nearly impossible. This condition leaves internal fibers in the bundle in a low density, random pattern which will now allow optically efficient interconnections.

The purpose of the present invention is to overcome the problems and disadvantages discussed hereinabove with respect to the prior art termination techniques for fiber bundles, and to provide a method for fiber bundle consolidation which results in very high density packing of the fibers, even when very small diameter fibers are employed in the bundle, and is not significantly effected by rotational misalignment problems such as results from the use of split tine contact or hexagonal ferrule as described hereinabove.

SUMMARY OF THE INVENTION

According to the principal aspect of the present invention, there is provided a fiber optic cable for a fiber optic connector in which a fiber optic bundle is terminated in a hollow ferrule having a cylindrical wall with circumferentialy spaced, longitudinally extending, flat surfaces thereon adjacent to the tip of the ferrule. The ferrule is compressed around the bundle to consolidate the fibers therein. The flat surfaces inside the ferrule allow the peripheral fibers to slide past one another allowing fiber bundle cconsolidation to proceed nearly to completion when external compressive forces are applied to the end of the ferrule. Thus, compression hoop effects on the peripheral fibers of the bundle are minimized, thereby allowing a high density packing of the fibers to be achieved which results in optical transmission losses less than that achieved hereto before in a commercially practical product. The ferrule preferably has a cylindrical outer surface so that no keying of abutting fiber optic cables employing the invention is required thereby minimizing optical losses due to concentricity deviations in the ferrules and rotational misalignments therebetween.

The present invention achieves greater consolidation of the fibers in the ferrule than the hexagonal ferrule employed in Love et al. wherein there is no constriction of the ferrule at all or than disclosed in said application Ser. No. 514,820 wherein the shrinkable hexagonal ferrule will not constrict nearly so much as will our ferrule which is subjected to external compressive forces. In addition, the invention permits high density fiber packing of optical fiber bundles to be achieved on a reproducible basis under normal production conditions.

BRIEF DESCRIPTION OF THE DRAWINGS

FIG. 2 is a fragmentary partial longitudinal sectional view of the connector showing the details of the structure of the fiber optic cable employed in the connector;

FIG. 3 is a longitudinal sectional view through the contact which terminates the fiber optic bundle of the cable illustrated in FIGS. 1 and 2 prior to assembly to the bundle;

FIG. 4 is an elevational view of the rear end of the contact illustrated in FIG. 3;

FIG. 5 is an enlarged elevational view of the forward end of the contact illustrated in FIG. 3;

DESCRIPTION OF THE PREFERRED EMBODIMENT

Figure 1:
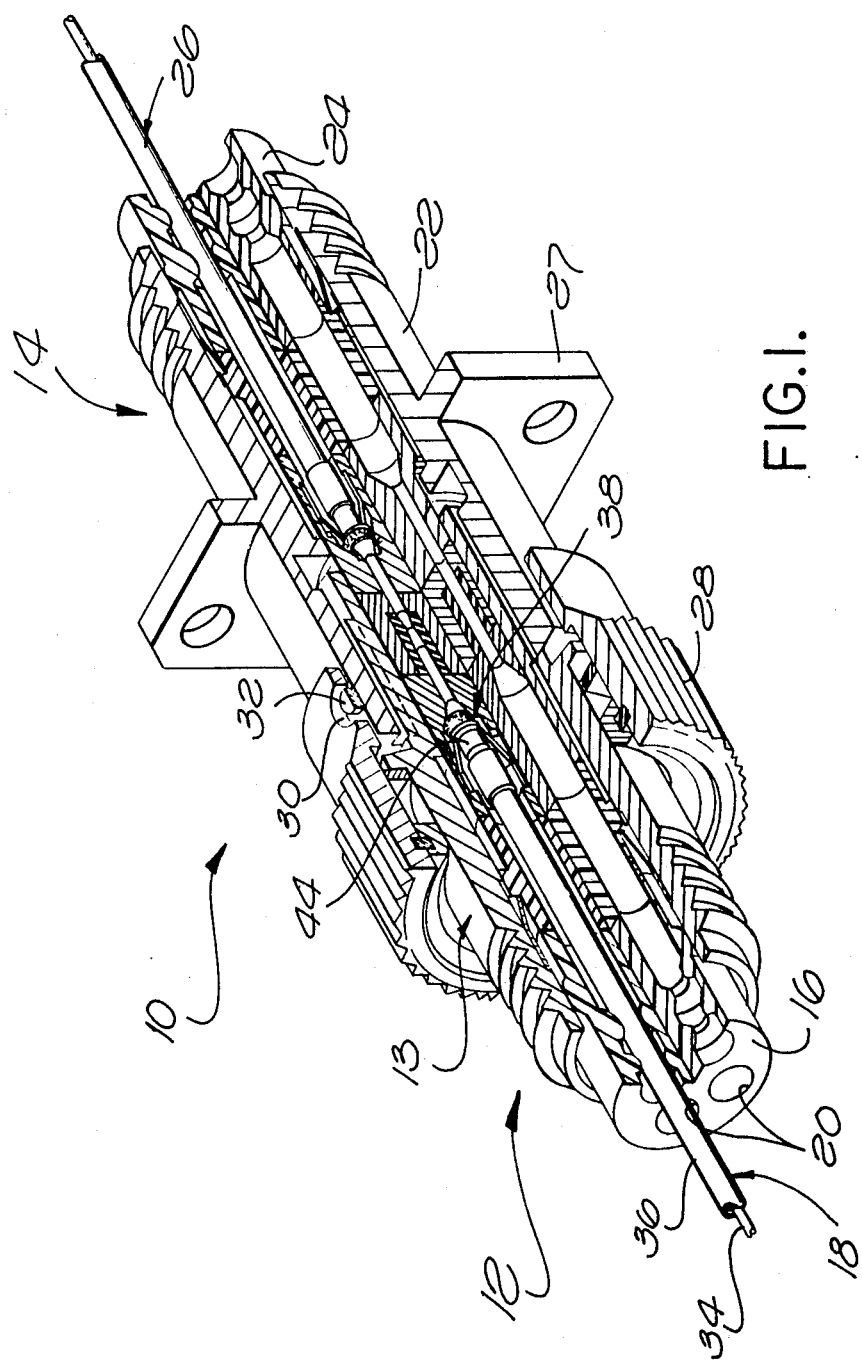
FIG. 1 is a partial cutaway perspective view of a fiber optic connector showing the connector members mated with single pair of signal connector fiber optic cables therein.

Referring now to the drawings in detail, there is illustrated in FIG. 1 a fiber optic connector assembly generally designated 10 comprising a plug connector member 12 mated to a receptacle connector member 14. The plug connector member 12 comprises a shell 13 containing a support member 16 which supports a plurality of fiber optic cables 18, only one being illustrated for purposes of clarity. It is noted that the support member 16 contains four axially extending passages 20 therethrough for holding fiber optic cables. It will be appreciated that any number of cables may be mounted in the connector member 12.

The mating receptacle connector member 14 also includes a shell 22 containing a support member 24 for fiber optic cables 26 equal in number to the cables 18 in plug connector member 12 and axially aligned therewith. The shell 22 has a mounting flange 27 thereon for mounting the connector 10 to a suitable panel or the like. The plug connector member 12 carries a rotatable coupling nut 28 having an arcuate slot 30 therein which cooperates with a pin 32 on the sheel 22 to provide a bayonet connection between the two connector members, as well known in the electrical connector field, which allows the two connector members to be mated upon rotation of the coupling nut 28.

The support member 16 and 24 in the connector shells may be single pieces or multiple piece arrangements, as illustrated in FIG. 1.

The fiber optic cables 18 and 26 are identical and therefore only one of such cables 18 will be described, it being understood that the description thereof is applicable to the other cable 26. The various components of the cables will be designated by the same reference numerals. The cable 18 comprises a fiber optic bundle 34 with a jacket 36 surrounding the bundle. A termination pin or contact 38 terminates the end of the bundle 34. The contact is a hollow ferrule preferably formed of a stable plastic.

A collar 44 is slidable on the contact 38 behind an annular groove 46 in the contact. A spring retention element 48 is mounted in the support member 16 surrounding the collar 44. The retention element has a pair of forwardly and inwardly extending spring fingers 50 engaging a rearwardly facing shoulder 52 on the collar 44 limiting rearward movement of the contact 38 in the support member 16. A resilient annular ring 56 lies within the groove 46 for axial tolerance relief. The ring 56 also limits forward movement of the termination pin in the connector by its engagement with rearwardly facing tapered surface 58 on the support member 16. The mounting arrangement for the contact on the cable 26 may be to that employed in the support member 16 for the contact on cable 18.

When the connector members 12 and 14 are mated together, the ends of the contacts 38 for the two fiber optic cables 16 and 26 abut each other in axial alignment. In order to assure that axial alignment is achieved between the opposed contacts, an elastomeric sleeve 60 is provided in a recess 62 in the support member 24. The sleeve surrounds the abutting ends of the contacts 38. The length of the sleeve 60 may be greater than the distance between the front face 64 of the support 24 and the bottom 66 of recess 62 so that when the connector members are mated the support member 16 will apply compressive force to the end of the sleeve 60 causing it to contract radially inwardly, tightly fitting around the ends of the contacts 38 and effecting a very accurate axial alignment therebetween.

The specific structure described so far herein for the contact 38, the mounting arrangement therefor in the support 16, and the axial alignment sleeve 60 are given by way of example only and constitute no part of the present invention. As will be seen from the following description, the advantages of the present invention may be achieved in any fiber optic connector wherein fiber bundles are axially aligned in abutting relationship.

The forward region of each contact 38 between the forward end 70 thereof and the shoulders 54 is cylindrical, but has a slightly reduced diameter adjacent to the forward end 70 as indicated at 72 in FIG. 2. The reduced section 72 is due to the compression of the end of the contact to compact the fiber bundle 34 therein as will be explained later herein. A bore, generally designated 73, extends lengthwise through the contact from the forward end 70 to the rear end 76 thereof. The bore 73 includes a forward section 74 and a rear section 78. The rear section of the bore has a diameter greater than that of the forward section 74 and is just sufficiently large to slidably receive therein the jacket 36 of the fiber optic cable 26. The forward section 74 of the bore is joined to the rear enlarged section 78 by a tapered transitional section 80. The forward section of the bore has a diameter sufficiently great to slidably receive the fiber bundle 34. The forward end 82 of the bundle is coplanar with the forward end 70 of the contact.

Reference is now made to FIGS. 3–5 of the drawings which illustrate the configuration of the contact 38 prior to its installation on the end of the fiber optic cable 26. As seen in FIG. 3, the outer surface of the forward portion of the contact is cylindrical up to the end 70 thereof and the forward section 74 of the bore has a generally cylindrical configuration except for a plurality of circumferentially spaced, longitudinally extending flat surface 84 which extend rearwardly a short distance from the forward end 70 of the contact. The flat surfaces taper rearwardly until they merge into the cylindrical wall of the bore. As seen in FIG. 5, preferably six flat surfaces 84 are formed on the wall of the bore although a larger or smaller number of such surfaces could be provided if desired. Preferably the flat surfaces 84 adjacent to the forward end 70 of the contact take up at least one-half the circumferential dimensions of the bore at said end. In other words, preferably the total length or circumferential distance of the arcuate sections of the bore which join the flat sections, as can be seen in FIG. 5 is less than one-half of the circumference of the bore. The purpose of the flat surface will be described later. Preferably the length of the arcuate portions of the bore 74 adjacent to the end 70 of the contact should be no less than about one third of the circumference of the bore so that the end of the bore 73, when the contact is constricted at its tip, will have a generally circular configuration whereby the mating contacts for the two fiber optic cables 18 and 26 will suffer only minimal losses due to relative rotational positions of the contacts. It further will be appreciated that since the outer surface of the forward portion of the contact 38 is cylindrical, axial alignment of the abutting contacts is simplified by the use of the compressible sleeve 60. Thus, optical transmission losses due to concentricity deviations are minimized by the present invention.

To assemble the contact 38 to the cable 26, the end of the jacket 36 of the cable is removed to leave a bare end of the bundle 34 exposed. The bundle is inserted through the rear end 76 of the contact into the forward end thereof until its forward end 82 is approximately coplanar with the end 70 of the contact. In this position, the forward portion of the jacket 36 abuts against the transitional tapered region 80 of the bore within the contact. Since the rear section of the contact bore is enlarged, the fiber bundle 34 may be readily inserted thereinto so that the peripheral fibers in the bundle will not catch on the contact and break. The tapered region 80 in the contact guides the forward ends of the fibers in the bundle 34 into the smaller forward section 74 of the bore. Thereafter, a uniform external compressive force is applied to the outer surface of the tip of the contact 38 to constrict the same as indicated at 72 in FIG. 2. Because of the flat surface 84 on the wall of the bore in the contact, the peripheral fibers of the fiber bundle will slide past one another during constriction of the contact, allowing fiber bundle consolidation to proceed nearly to completion. Thus, the problem of compression hoop effects on the peripheral bundle fibers is overcome by the use of the flat surfaces on the inner surface of the cylindrical bore. Furthermore, by the application of an external compressive force to the tip of the cylindrical stable plastic contact, almost complete fiber consolidation can be achieved, which is not possible by simply sliding an optical fiber bundle into a ferrule or by utilizing a ferrule formed of heat-shrinkable material. The latter is not capable of constricting sufficiently to achieve equivalent consolidation of the fibers. Further, if flat surfaces were formed on the interior of a heat-shrinkable plastic sleeve, for example, the flats would be lost during the heating operation. Therefore the results achieved by the present invention could not be achieved by the use of a heat-shrinkable plastic sleeve. The uniform application of a compressive force on the outer surface of the stable plastic contact end does not alter the configuration of the inside of the contact as in the case of a heat shrinkable plastic sleeve. The contact need not necessarily be formed of a plastic. Alternatively, the contact could be a metal ferrule which has flat circumferentially spaced surfaces on its inner surface and is crimped to cause it to constrict about the bundle and consolidate the fibers therein.

Preferably, the contact 38 is formed of a stable thermoplastic such as Valox polyester sold by General Electric Company. The end of the contact may be constricted by the use of a suitable die having a bore therein of consecutively smaller sections so that when the contact with the fiber bundle therein is forced axially into the bore the tip of the contact will be reduced in diameter when it reaches the smallest diameter section of the bore. Preferably, the die is heated to facilitate the constriction of the tip of the contact. Alternatively, the tip of the contact could be mounted in a suitable crimping tool, which may be heated, that applies external mechanical pressure to the outer surface of the contact to constrict the same. The contact could also be formed of a thermoset plastic in which only external mechanical pressure would be utilized to constrict the end of the contact.

Figure 6:
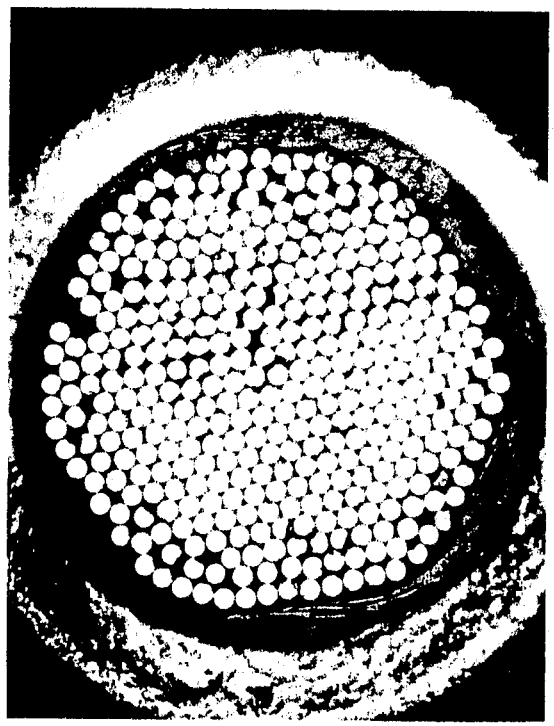
FIG. 6 is a photograph, enlarged 60 times, of the end of a fiber optic bundle terminated by a contact in accordance with the present invention showing how the fibers in the bundle are consolidated within the end of the contact.
Figure 7:
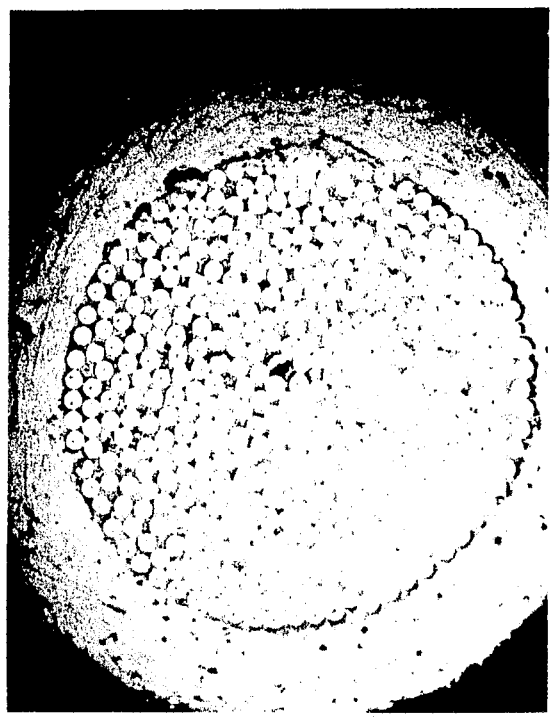
FIG. 7 is a photograph, similar to FIG. 6, showing the end of a fiber optic bundle terminated by a compressed contact having a cylindrical inner wall.

Reference is now made to FIG. 6 of the drawing which is a photograph of the end of an actual fiber optic bundle terminated by a stable plastic contact made in accordance with the present invention with an outer protective metal sleeve surrounding the contact. The sleeve has an inwardly extending flange covering the outer region of the end of the contact for axially spacing the ends of mating contacts apart. The diameter of the individual fibers in the fiber bundle mounted in the contact was 2.1 mils. The bundle contained 396 fibers. It can be seen that after constriction of the end of the stable plastic contact the six flat surfaces therein remained. A very high density packing of the fibers was achieved in the central region of the bundle. The ends of any three adjacent fibers in a substantial area of the central region of the fiber bundle engage each other and are disposed at the vertices of an equilateral triangle. The ends of any three adjacent fibers in a substantial area of the peripheral region of the fiber bundle do not lie in such a pattern. Nevertheless, the fiber ends are more closely packed together than when the contact has a cylindrical inner bore, without the flat surfaces, as shown in the photograph in FIG. 7. The contact shown in FIG. 7 is identical in all respects to that shown in FIG. 6 and was produced in the same fashion except flat surfaces were not formed on the wall of the contact bore and the outer protective sleeve was omitted. It is clearly seen from a comparison of FIGS. 6 and 7 that the peripheral fibers in the bundle in the present invention illustrated in FIG. 6 do not align in a compression hoop as do the peripheral fibers in the bundle illustrated in FIG. 7. We have found that light transmission losses through fiber optic cables terminated by contacts constructed in accordance with the present invention, and as specifically shown in FIG. 6, are only 2.7 dB. This loss is surprisingly low for a fiber bundle having fibers of small diameter, namely, 2.1 mils. The loss is less than the best results reported with respect to the Love et al. hex sleeve arrangement for equally small diameter fibers. Such loss is also substantially less than the termination arrangement illustrated in FIG. 7, which suffers a loss on the order of 4 dB. The present invention has the further, and very practical, advantage over the prior art termination arrangements in that the compression of the contact about the bundle is highly reproducible on a production basis since the compression forces and heat applied to the plastic pin can be closely controlled. Light transmission losses through fiber bundles terminated in accordance with the present invention deviate only about 7%. Such results have not heretofore been obtainable for fiber bundle interconnection arrangements in which the bundles contain very small diameter fibers.

What is claimed is:

1. A fiber optic cable for use in a fiber optic connector comprising:

a fiber optic bundle including a plurality of light transmitting fibers terminating in a planar end surface;

a hollow ferrule compressed around said bundle having a forward end coplanar with said end surface, said fibers being arranged in a closed pack array in the bore in said ferrule; and said bore having a generally cylindrical wall with circumferentially spaced, longitudinally extending, flat surfaces thereon extending rearwardly from said forward end of said ferrule for minimizing compression hoop effects on the peripheral fibers of said bundle, said spaced flat surfaces being joined by arcuate segments of said cylindrical wall.

2. A fiber optic cable as set forth in claim 1 wherein:
   six of said flat surfaces are formed on said wall of said bore substantially equally, circumferentially spaced from each other.

3. A fiber optic cable as set forth in claim 1 wherein:
   said bore has forward and rear axial sections, said rear axial section having a cross section greater than that of said forward axial section of said bore and sufficiently large to allow unrestricted fiber bundle entry therein from the rear end of said ferrule.

4. A fiber optic cable as set forth in claim 3 wherein:
   said forward and rear sections of said bore are axially spaced and joined by a tapered transitional section.

5. A fiber optic cable as set forth in claim 3 wherein:
   said fiber bundle includes a cylindrical jacket therearound extending into said rear axial section of said bore and terminating short of said forward axial section.

6. A fiber optic cable as set forth in claim 1 wherein:
   said ferrule is formed of a stable plastic.

7. A fiber optic cable as set forth in claim 2 wherein:
   said ferrule is formed of a stable plastic.

8. A fiber cable as set forth in claim 1 wherein:
   the ends of any three adjacent fibers in a substantial area of the central region of said fiber bundle engage each other and are disposed at the vertices of an equilateral triangle; and
   the ends of any three adjacent fibers in a substantial area of the peripheral region of said fiber bundle lie in a pattern other than at the vertices of an equilateral triangle.

9. A fiber cable as set forth in claim 1 wherein:
   the outer surface of said ferrule is cylindrical.

10. A fiber optic cable as set forth in claim 1 wherein:
    said fiber bundle includes a jacket therearound, said jacket being removed from the forward end portion of said bundle to provide a bare bundle end; and
    said bare bundle end being surrounded along its entire axial length by said cylindrical wall.

11. A fiber optic cable as set forth in claim 1 wherein:
    the forward portion of said ferrule tapers toward said forward end thereof.

* * * * *